US009651175B2

(12) United States Patent
Arai et al.

(10) Patent No.: US 9,651,175 B2
(45) Date of Patent: May 16, 2017

(54) SEAMLESS STEEL PIPE FOR LINE PIPE

(71) Applicant: NIPPON STEEL & SUMITOMO METAL CORPORATION, Tokyo (JP)

(72) Inventors: Yuji Arai, Tokyo (JP); Yukimasa Ueda, Tokyo (JP); Kei Murata, Tokyo (JP); Yasuyoshi Hidaka, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/909,152

(22) PCT Filed: Jun. 13, 2014

(86) PCT No.: PCT/JP2014/065757
§ 371 (c)(1),
(2) Date: Feb. 1, 2016

(87) PCT Pub. No.: WO2015/019708
PCT Pub. Date: Feb. 12, 2015

(65) Prior Publication Data

US 2016/0161028 A1 Jun. 9, 2016

(30) Foreign Application Priority Data

Aug. 6, 2013 (JP) ................................ 2013-162885

(51) Int. Cl.
*F16L 9/02* (2006.01)
*C22C 38/58* (2006.01)
(Continued)

(52) U.S. Cl.
CPC ................ *F16L 9/02* (2013.01); *C21D 1/613* (2013.01); *C21D 6/004* (2013.01); *C21D 6/005* (2013.01);
(Continued)

(58) Field of Classification Search
CPC ......... C22C 38/48; C22C 38/00; C22C 38/58; C22C 38/08; C22C 38/12; C22C 38/16;
(Continued)

(56) References Cited

U.S. PATENT DOCUMENTS

2005/0167013 A1* 8/2005 Murao .................... C21D 8/10
148/593
2007/0089813 A1 4/2007 Tivelli et al.
2008/0216928 A1 9/2008 Kobayashi et al.

FOREIGN PATENT DOCUMENTS

CN 1688726 10/2005
CN 1788101 6/2006
(Continued)

OTHER PUBLICATIONS

Machine Translation, Ueda et al., JP 2013-082979, May 2013.*

*Primary Examiner* — Michael E La Villa
(74) *Attorney, Agent, or Firm* — Clark & Brody

(57) ABSTRACT

There is provided a seamless steel pipe for line pipe, wherein a chemical composition consists, by mass percent, of C: 0.03-0.10%, Si: ≤0.50%, Mn: 1.0-2.0%, P: ≤0.050%, S: ≤0.005%, Cr: 0.05-1.0%, Mo: 0.01-0.30%, Al: 0.001-0.10%, N: ≤0.01%, Ni: 0.04-2.0%, Ca: 0.0005-0.0050%, Cu: 0-2.0%, Ti: 0-0.05%, Nb: 0-0.05%, V: 0-0.10%, the balance: Fe and impurities, and satisfies the conditions of Cu+Ni: ≥0.10%, and Mo+V: ≤0.30%, wherein in a scale formed on the surface of the steel pipe, metal particles consisting mainly of Ni or Cu having an average circle-equivalent diameter of 0.1-5 μm exist, and a distance from a boundary between the base metal of the steel pipe and the scale to a region in which the metal particles do not exist is 20 μm or longer.

8 Claims, 1 Drawing Sheet

(51) Int. Cl.

| | |
|---|---|
| ***C22C 38/50*** | (2006.01) |
| ***C22C 38/48*** | (2006.01) |
| ***C22C 38/46*** | (2006.01) |
| ***C22C 38/44*** | (2006.01) |
| ***C22C 38/42*** | (2006.01) |
| ***C22C 38/06*** | (2006.01) |
| ***C22C 38/04*** | (2006.01) |
| ***C22C 38/02*** | (2006.01) |
| ***C22C 38/00*** | (2006.01) |
| ***C21D 8/10*** | (2006.01) |
| ***C21D 6/00*** | (2006.01) |
| ***C21D 1/613*** | (2006.01) |
| ***C21D 9/08*** | (2006.01) |
| ***C22C 38/40*** | (2006.01) |
| *B21B 3/00* | (2006.01) |

(52) U.S. Cl.

CPC .............. *C21D 6/008* (2013.01); *C21D 8/10* (2013.01); *C21D 8/105* (2013.01); *C21D 9/08* (2013.01); *C21D 9/085* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/58* (2013.01); *B21B 3/00* (2013.01); *C21D 2211/002* (2013.01); *Y10T 428/1259* (2015.01); *Y10T 428/1266* (2015.01); *Y10T 428/12583* (2015.01); *Y10T 428/12611* (2015.01); *Y10T 428/12618* (2015.01); *Y10T 428/12882* (2015.01); *Y10T 428/12903* (2015.01); *Y10T 428/12917* (2015.01); *Y10T 428/12924* (2015.01); *Y10T 428/12937* (2015.01); *Y10T 428/12944* (2015.01); *Y10T 428/12993* (2015.01); *Y10T 428/24942* (2015.01); *Y10T 428/24983* (2015.01); *Y10T 428/26* (2015.01)

(58) Field of Classification Search

CPC ......... C22C 38/50; C22C 38/46; C22C 38/44; C22C 38/18; C22C 38/20; C22C 38/22; C22C 38/24; C22C 38/26; C22C 38/28; C22C 38/40; C22C 38/42; C22C 38/06; C22C 38/04; C22C 38/02; C22C 38/002; C22C 38/001; Y10T 428/1266; Y10T 428/12583; Y10T 428/1259; Y10T 428/12611; Y10T 428/12618; Y10T 428/12882; Y10T 428/12903; Y10T 428/12917; Y10T 428/12924; Y10T 428/12937; Y10T 428/12944; Y10T 428/12993; Y10T 428/24942; Y10T 428/24983; Y10T 428/26

See application file for complete search history.

(56) References Cited

FOREIGN PATENT DOCUMENTS

| | | | |
|---|---|---|---|
| CN | 101151387 | | 3/2008 |
| CN | 102581553 | | 7/2012 |
| CN | 102906292 | | 1/2013 |
| EP | 1 876 254 | | 1/2008 |
| JP | 63-143222 | | 6/1988 |
| JP | 2-243722 | | 9/1990 |
| JP | 2-282427 | | 11/1990 |
| JP | 2004-143593 | | 5/2004 |
| JP | 2004-176172 | | 6/2004 |
| JP | 2007-031769 | | 2/2007 |
| JP | 2013-082979 | * | 5/2013 |
| JP | 2013-139630 | | 7/2013 |
| WO | 2004/031420 | | 4/2004 |
| WO | 2011/114896 | | 9/2011 |

* cited by examiner

SEAMLESS STEEL PIPE FOR LINE PIPE

TECHNICAL FIELD

The present invention relates to a seamless steel pipe for line pipe and a method for producing the same and, more particularly, to a high-strength seamless steel pipe for line pipe having a low surface hardness and a method for producing the same.

BACKGROUND ART

In recent years, the mining conditions of oil wells and gas wells (hereinafter, oil and gas wells are collectively referred to simply as "oil wells") of crude oil, natural gas, and the like have become severer. Concerning the mining environments, as the mining depth increases, the atmosphere contains $CO_2$, $H_2S$, $Cl^-$, and the like, and the mined crude oil and natural gas also contain large amounts of $H_2S$. Therefore, the requirement on performance of a line pipe for transmitting the crude oil and natural gas has also become more rigid, and a demand for steel pipes for line pipe having sulfide resistance has increased.

The standards of National Association of Corrosion Engineers (NACE) specify the highest hardness of steel for steels used in $H_2S$ environments from the viewpoint of sulfide stress cracking resistance (hereinafter, referred also to as "SSC resistance"), which is 250 HV10 or lower for carbon steels. Also, to assure safety, steels may, in some cases, be required to have the highest hardness of 230 HV10 or lower in consideration of the hardening of weld heat affected zone. Therefore, for steels that are required to have sulfide resistance, the improvement in technique for restraining hardness has become an important problem. The "HV10" means a "hardness symbol" in the case where Vickers hardness test is conducted with the test force being 98.07 N (10 kgf).

In the case where a high-strength seamless steel pipe for line pipe is produced, unlike the production process of UO steel pipes in which controlled rolling is performed, it is a common practice to perform quenching followed by tempering, in order to assure strength. For a low-alloy steel such as a steel for line pipe, by the ordinary quenching tempering treatment, martensite is not formed, and a micro-structure consists mainly of bainite. Because of great dependence on cooling rate, the micro-structure sometimes differs between the surface and the interior of steel pipe. Therefore, as compared with the interior in which the cooling rate is low, the surface, on which the cooling rate is high, tends to have a high hardness. As the result, the highest hardness on the surface becomes high with respect to the strength of steel. This tendency becomes remarkable as the strength increases and the wall thickness increases because of the increase in amount of added alloying elements.

Patent Document 1 discloses a seamless steel pipe having a wall thickness of 30 mm or larger and a high strength of X65 grade or higher (yield strength: 448 MPa or higher). Also, Patent Document 2 discloses a seamless steel pipe having a strength of X70 grade or higher and excellent hydrogen-induced cracking resistance.

To solve the problem of increase in the highest hardness, Patent Document 3 proposes a method for softening only the casehardened layer by means of local heating such as induction heating due to high-frequency current. Also, Patent Document 4 proposes a method for performing the quenching tempering treatment from a two-phase region of austenite and ferrite. Further, Patent Document 5 proposes a method in which cooling is stopped by controlled cooling in mid-course and the outer near-surface portion is subjected to heat recuperation by the heat in the high-temperature portion on the surface side in a steel pipe, before cooling again the outer near-surface portion.

LIST OF PRIOR ART DOCUMENTS

Patent Document

Patent Document 1: US2007/0089813A
Patent Document 2: JP2004-143593A
Patent Document 3: JP63-143222A
Patent Document 4: JP2-282427A
Patent Document 5: JP2-243722A

DISCLOSURE OF THE INVENTION

Problems to be Solved by the Invention

Generally, a seamless steel pipe for line pipe is produced through a quenching tempering process. Therefore, the hardness of steel pipe near-surface portion that is inevitably cooled rapidly is higher than the hardness of the central portion of wall thickness of steel pipe. In Patent Documents 1 and 2, however, the surface hardness is not considered, and therefore there arises a following problem: it is difficult to stably make the hardness of steel pipe near-surface portion 250 HV10 or lower.

In the method disclosed in Patent Document 3, in addition to the cooling equipment used during quenching, cooling equipment used after local heating is necessary, and also the control of heat treatment temperature is complicated. Also, the method disclosed in Patent Document 4 has a following problem: a good micro-structure cannot necessarily be obtained from the viewpoint of the balance of strength, toughness, and corrosion resistance. The method disclosed in Patent Document 5 has a following problem: it is difficult to control the productivity and heat treatment temperature and to assure the balance of strength, toughness, and the like.

The present invention has been made to solve the above-described problems, and accordingly an objective thereof is to provide a high-strength and high-toughness seamless steel pipe for line pipe, in which the surface hardness is kept low, and a method for producing the seamless steel pipe.

Means for Solving the Problems

The present inventors earnestly studied a method for increasing the strength and toughness and for keeping the surface hardness low, and resultantly came to obtain the following findings.

Steel pipes were subjected to quenching tempering treatment, and surface hardness was measured at various places. Resultantly, it was found that the measured values varied greatly. If the heat treatment conditions are fixed, the surface hardness of steel pipe is determined by the chemical composition and the cooling rate. The chemical composition on the steel pipe surface was analyzed, and resultantly the segregation of components was not recognized Therefore, it is thought that the variations in surface hardness are attributable to the variations in local cooling rate.

Accordingly, the cause for variations in cooling rate on the steel pipe surface was further studied. The surface properties of steel pipe were observed in detail, and it was found that the hardness is high in a location where the scale on the steel pipe surface is detached, and the hardness is low in a location where the scale adheres firmly to the surface.

That is to say, the variations in cooling rate depend on whether the scale adheres tightly to the surface or peels off. Therefore, it is thought that if the scale on the steel pipe surface can be caused to adhere to the surface uniformly, the variations in hardness are suppressed, and therefore the highest hardness can be restrained.

The present inventors studied the method for improving the adhesion of scale, and found out that by containing a predetermined amount of Ni or further Cu in the base metal of steel pipe, metal particles consisting mainly of Ni or Cu are dispersed finely in the scale, and thereby the adhesion of scale can be improved.

The relationship between the adhesion of scale and the dispersing state of metal particles was further examined. As the result, it was found that in order to improve the adhesion of scale, a simple dispersion of metal particles consisting mainly of Ni or Cu in scale is not enough, and it is important to cause the scale to grow sufficiently, and to cause the metal particles to exist in a wide range from the boundary between base metal and scale toward the scale side.

Generally, if the thickness of scale increases, the scale adhesion deteriorates. However, the scale in which metal particles consisting mainly of Ni or Cu are dispersed exerted good adhesion even if the scale was thick. Also, a thick scale reduces the cooling rate of the steel pipe surface portion due to the thermal insulation effect, so that the increase in surface hardness can be suppressed.

With the decrease in cooling rate in the near-surface portion, the cooling rate in the central portion of wall thickness further decreases. This phenomenon establishes a condition that the strength is less liable to increase. However, by containing Ni or further Cu in the steel, the hardenability is guaranteed, so that high strength and toughness can be maintained Furthermore, since the as-quenched hardness depends on the carbon content, by keeping the C content low, the hardness can be decreased. Also, in order to restrain the surface hardness, it is necessary to properly control the contents of Mo, V and Nb that cause secondary hardening during tempering.

The present invention has been accomplished on the basis of the above-described findings, and involves the seamless steel pipe for line pipe and the method for producing the same that are described below.

(1) A seamless steel pipe for line pipe, wherein a chemical composition consists, by mass percent, of C: 0.03 to 0.10%,
Si: 0.50% or less,
Mn: 1.0 to 2.0%,
P: 0.050% or less,
S: 0.005% or less,
Cr: 0.05 to 1.0%,
Mo: 0.01 to 0.30%,
Al: 0.001 to 0.10%,
N: 0.01% or less,
Ni: 0.04 to 2.0%,
Ca: 0.0005 to 0.0050%,
Cu: 0 to 2.0%,
Ti: 0 to 0.05%,
Nb: 0 to 0.05%,
V: 0 to 0.10%,
the balance: Fe and impurities, and
the chemical composition satisfies the conditions of
Cu+Ni: 0.10% or more, and
Mo+V: 0.30% or less, wherein in a scale formed on the surface of the steel pipe, metal particles consisting mainly of Ni or Cu having an average circle-equivalent diameter of 0.1 to 5 μm exist, and a distance from a boundary between the base metal of the steel pipe and the scale to a region in which the metal particles do not exist is 20 μm or longer.

(2) The seamless steel pipe for line pipe according to (1), wherein the chemical composition contains, by mass percent, one or more elements selected from
Cu: 0.01 to 2.0%,
Ti: 0.003 to 0.05%,
Nb: 0.01 to 0.05%, and
V: 0.02 to 0.10%.

(3) The seamless steel pipe for line pipe according to (1), wherein the chemical composition consists, by mass percent, of
C: 0.03 to 0.10%,
Si: 0.30% or less,
Mn: 1.00 to 1.80%,
P: 0.020% or less,
S: 0.003% or less,
Ti: 0.001 to 0.015%,
Al: 0.001 to 0.050%,
Ni: 0.04 to 0.30%,
Cu: 0 to 0.30%,
Cr: 0.05 to 0.40%,
Mo: 0.02 to 0.15%,
V: 0.02 to 0.09%,
Ca: 0.0005 to 0.0030%,
N: 0.008% or less,
the balance: Fe and impurities, and
the chemical composition satisfies the conditions of
Cu+Ni: 0.10 to 0.50%, and
Mo+V: 0.05 to 0.20%.

(4) The seamless steel pipe for line pipe according to (3), wherein the highest hardness at a position 1 mm deep from the surface is 230 HV10 or lower.

(5) The seamless steel pipe for line pipe according to any one of (1) to (4), wherein:

a metal micro-structure of the steel pipe contains bainite of 50% or more in area fraction; and a wall thickness of the steel pipe is 30 mm or larger.

(6) The seamless steel pipe for line pipe according to any one of (1) to (5), wherein at a position 10 μm distant from the boundary to the scale side, the number density of the metal particles observed per unit area is $5\times10^3$ pieces/mm$^2$ or higher.

(7) The seamless steel pipe for line pipe according to any one of (1) to (6), wherein a difference between the average hardness at the position 1 mm deep from the surface of the steel pipe and the average hardness in the central portion of the wall thickness is 30 HV10 or smaller.

(8) The seamless steel pipe for line pipe according to any one of (1) to (7), wherein a difference between the maximum value and the minimum value of the hardness at the position 1 mm deep from the surface of the steel pipe is 40 HV10 or smaller.

(9) A method for producing the seamless steel pipe for line pipe, wherein the steel pipe having the chemical composition described in any one of (1) to (3) is conveyed into a furnace after the finish of hot rolling, being heated in an atmosphere with the temperature of $Ac_3$+50° C. or higher and the water vapor concentration of 5% or higher, and thereafter is subjected to quenching treatment in which accelerated cooling is performed at a rate of 10° C./s or higher, subsequently being tempered at a temperature of $Ac_1$−50° C. or lower.

(10) The method for producing the seamless steel pipe for line pipe according to (9), wherein after the finish of hot rolling, the steel pipe is conveyed into a furnace before the surface temperature of the steel pipe decreases to a temperature lower than the $Ar_3$ transformation point.

Advantageous Effects of the Invention

According to the present invention, the steel pipe has a yield strength of 448 MPa or higher, and also the highest hardness on the surface of steel pipe can be restrained to 250 HV10 or lower, preferably 230 HV10 or lower, so that a high-strength and high-toughness seamless steel pipe excellent in SSC resistance can be obtained. Therefore, the seamless steel pipe according to the present invention can be used suitably as a line pipe for transmitting crude oil and natural gas containing large amounts of $H_2S$.

MODE FOR CARRYING OUT THE INVENTION

Components of the present invention is described below in detail.

1. Scale

The seamless steel pipe for line pipe according to the present invention have metal particles consisting mainly of Ni or Cu with an average circle-equivalent diameter of 0.1 to 5 μm in the scale formed on the surface of steel pipe. FIG. 1*a* is a backscattered electron image near the boundary between base metal and scale of the steel pipe according to the present invention, and FIGS. 1*b* and 1*c* are element mapping images of a region that is the same as the region of FIG. 1*a*, which are obtained by EPMA (Electron Probe MicroAnalyser). FIGS. 1*b* and 1*c* represent the distributions of Ni and Cu, respectively. In the present invention, the "metal particles consisting mainly of Ni or Cu" include the "metal particles consisting mainly of Ni and Cu".

The backscattered electron image and element mapping images are those of the steel pipe having been quenched; however, even if tempering is performed subsequently, the properties of scale and the dispersion state of metal particles are scarcely changed. The reason for this is as described below. Since the steel pipe is allowed to cool after being tempered, the scale does not peel off. Also, since the tempering temperature is lower than the quenching temperature, the diffusion rate of Ni and Cu is low, and the growth or movement of metal particles is less liable to occur.

Figure 1:
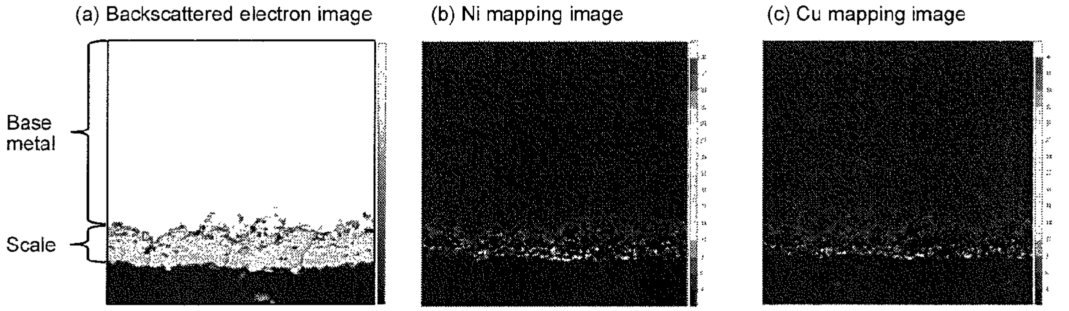
FIG. 1*a* is a backscattered electron image near the boundary between base metal and scale of the steel pipe of the present invention.
FIGS. 1*b* and 1*c* are element mapping images obtained by EPMA.

It can be seen that, near the boundary between base metal and scale, metal particles consisting mainly of Ni or Cu are dispersed as shown in FIG. 1. However, the metal particles do not exist in the whole of scale, and near the scale surface distant from the boundary between base metal and scale, a region is present where the metal particles do not exist.

Even if the metal particles exist in the scale, if the distance from the boundary between base metal and scale to the region in which the metal particles do not exist is shorter than 20 μm, the adhesion of scale is insufficient. Therefore, in order to improve the adhesion of scale and to suppress the variations in hardness and the highest hardness, the metal particles have to be dispersed widely in the scale, and it is necessary that the distance from the boundary between base metal and scale of the steel pipe to the region in which the metal particles do not exist be 20 μm or longer.

As the "distance from the boundary between base metal and scale to the region in which the metal particles do not exist", in the region in which the backscattered electron image (200 μm×200 μm) was obtained, throughout the overall length of boundary, the distance from the boundary to the region in which the metal particles do not exist is measured, and the maximum value of the distance is used.

Also, even if the metal particles are distributed in a wide range in the scale, if the number of metal particles is small, the effect of improving the adhesion of scale is sometimes insufficient. Therefore, at a position 10 μm distant from the boundary between base metal and scale to the scale side, the number density of metal particles consisting mainly of Ni or Cu having an average circle-equivalent diameter of 0.1 to 5 μm observed per unit area is preferably $5\times10^3$ pieces/mm$^2$ or higher. Also, if the number density of metal particles consisting mainly of Ni or Cu increases, that is, if the sizes of metal particles become excessively small, the ductility of scale decreases. Therefore, the number density of metal particles is preferably $5\times10^5$ pieces/mm$^2$ or lower.

As the number density of metal particles at the "position 10 μm distant from the boundary between base metal and scale to the scale side", around a position 10 μm distant from the boundary to the scale side, three regions each having a dimension of 20 μm in the direction perpendicular to the boundary and a dimension of 60 μm in the direction horizontal thereto are extracted randomly, and the mean value of measurement results of number densities in those regions is used. Also, the number density of metal particles is calculated as described below. The element mapping image of Ni or Cu obtained by EPMA is subjected to binarization processing of black and white, the number of particles in which Ni or Cu concentrates is counted, the particle numbers in three visual fields are arithmetically averaged, and the averaged value is divided by the measurement area (1200 μm$^2$).

2. Chemical composition

The seamless steel pipe for line pipe in accordance with the present invention has the chemical composition consisting, by mass percent, of C: 0.03 to 0.10%, Si: 0.50% or less, Mn: 1.0 to 2.0%, P: 0.050% or less, S: 0.005% or less, Cr: 0.05 to 1.0%, Mo: 0.01 to 0.30%, Al: 0.001 to 0.10%, N: 0.01% or less, Ni: 0.04 to 2.0%, Ca: 0.0005 to 0.0050%, Cu: 0 to 2.0%, Ti: 0 to 0.05%, Nb: 0 to 0.05%, V: 0 to 0.10%, the balance: Fe and impurities, and satisfying the conditions of Cu+Ni: 0.10% or more and Mo+V: 0.30% or less.

The term "impurities" means components that are mixed in on account of various factors in the production process including raw materials such as ore and scrap when an alloy is produced on an industrial basis, which components are allowed in the range of not exerting an adverse influence on the present invention.

The reason why the content of each element is restricted is as described below. In the following explanation, the symbol "%" for the content means "mass %".

C: 0.03 to 0.10%

C (carbon) is an element necessary for enhancing the hardenability and for increasing the strength. If the C content is less than 0.03%, the required strength cannot be assured. On the other hand, if the C content is more than 0 10%, the surface hardness is increased, and the SSC resistance is deteriorated. Also, when welding is performed, the hardening of weld heat affected zone and the deterioration in toughness occur. Therefore, the C content must be set to 0.03 to 0.10%. The C content is preferably 0.04% or more, and preferably 0.08% or less.

Si: 0.50% or Less

Si (silicon) is an element having a deoxidizing function and contributing to the increase in strength. However, if more than 0 50% of Si is contained, the precipitation of cementite is suppressed, and an M-A constituent (Martensite-Austenite constituent) is liable to precipitate. Therefore, the Si content is set to 0.50% or less. The Si content is preferably 0.30% or less. For the seamless steel pipe of the present invention, the lower limit of the Si content is not especially defined because too low a content of Si presents no problem unless the deoxidation of steel is hindered.

Mn: 1.0 to 2.0%

Mn (manganese) is an element for enhancing the hardenability without the increase in tempering softening resistance, and also effective in assuring the strength. If the Mn content is less than 1 0%, a high strength of 448 MPa or higher cannot be assured. On the other hand, if more than 2.0% of Mn is contained, the segregation increases, and also the hardenability becomes too high, so that the toughness is deteriorated in both of the base metal and the weld heat affected zone. Therefore, the Mn content has to be set to 1.0 to 2.0%. The Mn content is preferably 1.2% or more, and preferably 1.8% or less.

P: 0.050% or Less

P (phosphorus) is an element existing unavoidably in a steel as an impurity. However, if the P content is more than 0.050%, P segregates at the grain boundaries, and may deteriorate the toughness. Therefore, the P content is set to 0.050% or less. The P content is preferably 0.020% or less.

S: 0.005% or Less

S (sulfur) is an element existing unavoidably in a steel as an impurity. However, if the content of S is more than 0.005%, sulfide-based nonmetallic inclusions such as MnS are formed, and thereby the hydrogen-induced cracking resistance may be deteriorated. Therefore, the S content is set to 0.005% or less. The S content is preferably 0.003% or less.

Cr: 0.05 to 1.0%

Cr (chromium) is an element for enhancing the hardenability and the tempering softening resistance and for increasing the strength, so that 0.05% or more of Cr has to be contained. However, if more than 1.0% of Cr is contained, the toughness is deteriorated. Therefore, the Cr content is set to 0.05 to 1.0%. The Cr content is preferably 0.15% or more, and preferably 0.60% or less.

Mo: 0.01 to 0.30%

Mo (molybdenum) is an element for greatly enhancing the hardenability and the tempering softening resistance and for increasing the strength, so that 0.01% or more of Mo has to be contained. However, if more than 0.30% of Mo is contained, the tempering softening resistance becomes excessive, and the surface hardness after tempering does not decrease. Therefore, the content of Mo is set to 0.01 to 0.30%. The Mo content is preferably 0.05% or more, and preferably 0.25% or less.

Al: 0.001 to 0.10%

Al (aluminum) is an element having a deoxidizing function. If the content of Al is low, deoxidation becomes insufficient, and thereby the steel properties are deteriorated, so that 0.001% or more of Al has to be contained. However, if more than 0.10% of Al is contained, not only alumina-based nonmetallic inclusions such as $Al_2O_3$ are formed, but also the precipitation of cementite is suppressed, so that M-A constituent is liable to precipitate. Therefore, the content of Al is set to 0.001 to 0.10%. The Al content is preferably 0.01% or more, and preferably 0.05% or less.

N: 0.01% or Less

N (nitrogen) exists in a steel as an impurity. If the content of N is more than 0.01%, the steel properties are deteriorated. Therefore, the content of N is set to 0.01% or less.

Ni: 0.04 to 2.0%

Ni (nickel) is an element for improving the hardenability and toughness. Further, in the present invention, by containing Ni either singly or together with Cu, the metal particles consisting mainly of Ni or Cu are dispersed finely in the surface scale to improve the adhesion of surface scale. Therefore, 0.04% or more of Ni has to be contained. However, if more than 2 0% of Ni is contained, the SSC resistance of the weld heat affected zone deteriorates. Therefore, the Ni content is set to 0.04 to 2.0%. The Ni content is preferably 0.10% or more, and preferably 1.8% or less. Ni is an element effective also in preventing surface hot-shortness due to Cu during continuous casting and during hot rolling. In the case where it is desired to achieve this effect, the Ni content has to be made one third or more of the Cu content.

Ca: 0.0005 to 0.0050%

Ca (calcium) is used for mode control of nonmetallic inclusions such as MnS and $Al_2O_3$, and improves the toughness and hydrogen-induced cracking resistance. Therefore, 0.0005% or more of Ca has to be contained. However, if more than 0.0050% of Ca is contained, the Ca-based inclusions are liable to be clustered. Therefore, the Ca content is set to 0.0005 to 0.0050%. The Ca content is preferably 0.0010% or more, and preferably 0.0040% or less.

Cu: 0 to 2.0%

Cu (copper) is an element for improving the toughness and hardenability. Further, in the present invention, by containing Cu together with Ni, the metal particles consisting mainly of Ni or Cu are dispersed finely in the surface scale, and the adhesion of surface scale is improved. Therefore, Cu may be contained as necessary. However, if more than 2.0% of Cu is contained, the SSC resistance of the weld heat affected zone deteriorates. Therefore, the Cu content, if being contained, is set to 2.0% or less. The Cu content is preferably 1.5% or less, further preferably 1.2% or less.

The effect of improving the adhesion of scale can be achieved sufficiently even in the case where Ni is contained singly, so that Cu needs not necessarily be contained positively. However, since Ni is an expensive element, it is desirable to replace a part thereof with Cu. Also, a steel usually contains Cu as an impurity element, so that it is unfavorable in terms of economy to decrease the Cu content excessively. Therefore, the Cu content is preferably 0.01% or more, further preferably 0.02% or more.

Ti: 0 to 0.05%

Ti (titanium) is an element effective in preventing cracking of cast piece by means of the fixation of N in steel, so that Ti may be contained as necessary. However, if more than 0 05% of Ti is contained, the carbo-nitrides of Ti are coarsened, and the toughness is deteriorated. Therefore, the Ti content, if being contained, is set to 0.05% or less. The Ti content is preferably 0.01% or less. In the case where it is desired to achieve the above-described effect, the Ti content is preferably 0.003% or more.

Nb: 0 to 0.05%

Nb (niobium) is an element for greatly enhancing the hardenability and tempering softening resistance and for increasing the strength, so that Nb may be contained as necessary. However, if more than 0.05% of Nb is contained, the tempering softening resistance becomes excessive, and the surface hardness after tempering does not decrease. Therefore, the Nb content, if being contained, is set to 0.05% or less. The Nb content is preferably 0.04% or less. In the case where it is desired to achieve the above-described effects, the Nb content is preferably 0.01% or more, further preferably 0.02% or more.

V: 0 to 0.10%

V (vanadium) is an element for greatly enhancing the hardenability and tempering softening resistance and for increasing the strength, so that V may be contained as necessary. However, if more than 0.10% of V is contained, the tempering softening resistance becomes excessive, and the surface hardness after tempering does not decrease. Therefore, the V content, if being contained, is set to 0.10% or less. The V content is preferably 0.07% or less. In the case where it is desired to achieve the above-described effects, the V content is preferably 0.02% or more.

Cu+Ni: 0.10% or More

As described above, Cu and Ni have an effect of improving the adhesion of scale due to the dispersion in the surface scale as metal particles, and are important elements in the present invention. Therefore, the total content of Cu and Ni has to be 0.10% or more. Also, the total content of Cu and Ni has only to be 4.0% or less; however, if the total content of Cu and Ni is excessive, the SSC resistance may be deteriorated, and the steel pipe becomes uneconomical. Therefore, the total content of Cu and Ni is preferably 3.0% or less.

Mo+V: 0.30% or Less

As described above, Mo and V are elements for greatly enhancing the hardenability and tempering softening resistance and for increasing the strength. However, if Mo and V are contained excessively, the hardness does not decrease even after tempering, since Mo and V remarkably increase the tempering softening resistance. Therefore, the total content of Mo and V has to be restricted to 0.30% or less.

In order to restrain the highest hardness on steel pipe surface to 230 HV10 or lower more stably, the chemical composition of steel pipe preferably consists, by mass percent, of C: 0.03 to 0.10%, Si: 0.30% or less, Mn: 1.00 to 1.80%, P: 0.020% or less, S: 0.003% or less, Ti: 0.001 to 0.015%, Al: 0.001 to 0.050%, Ni: 0.04 to 0.30%, Cu: 0 to 0.30%, Cr: 0.05 to 0.40%, Mo: 0.02 to 0.15%, V: 0.02 to 0.09%, Ca: 0.0005 to 0.0030%, N: 0.008% or less, the balance: Fe and impurities, and satisfies the conditions of Cu+Ni: 0.10 to 0.50%, and Mo+V: 0.05 to 0.20%.

3. Metal Micro-Structure

Since the seamless steel pipe for line pipe according to the present invention is of a low-alloy steel, by the ordinary quenching tempering treatment, martensite is not formed, and a micro-structure consists mainly of bainite. As described before, for the micro-structure consisting mainly of bainite, the hardness greatly depends on the cooling rate. Therefore, in a location where the scale on the steel pipe surface is detached, the cooling rate is high and therefore the hardness is high, whereas in a location where the scale adheres firmly to the steel pipe surface, the cooling rate is low and therefore the hardness is low.

In the present invention, since the scale can be caused to adhere evenly, the highest hardness on the steel pipe surface can be restrained. That is to say, the effect of the present invention is exerted remarkably for the steel pipe having the metal micro-structure consisting mainly of bainite. Therefore, the seamless steel pipe for line pipe of the present invention preferably has a metal micro-structure containing bainite of 50% or more in area fraction. The area fraction of bainite in the metal micro-structure is preferably 70% or more, further preferably 85% or more. In the present invention, bainite includes an M-A constituent.

4. Wall Thickness of Steel Pipe

As the wall thickness of steel pipe increases, a difference in cooling rate between the surface and the interior of steel pipe occurs, and resultantly, the highest hardness on the surface becomes high with respect to the strength of steel. In the present invention, however, a thick scale can be attached closely to the steel pipe surface evenly. Therefore, due to the thermal insulation effect brought about by the thick scale, the cooling rate of the steel pipe surface portion is reduced, and the increase in surface hardness can be suppressed. That is to say, the effect of the present invention is exerted remarkably for the steel pipe having a large wall thickness. Therefore, the seamless steel pipe for line pipe of the present invention preferably has a wall thickness of 30 mm or larger. The wall thickness of steel pipe is more preferably 40 mm or larger, further preferably 45 mm or larger.

5. Surface Hardness

For the seamless steel pipe for line pipe according to the present invention, the difference between the average hardness at a position 1 mm deep from the surface and the average hardness in the central portion of wall thickness is preferably 30 HV10 or smaller, and the difference between the maximum value and the minimum value of the hardness at the position 1 mm deep from the surface is preferably 40 HV10 or smaller.

The hardness at the position 1 mm deep from the surface of steel pipe and in the central portion of wall thickness thereof can be measured, for example, by the method specified in API standards or the like. A test specimen is cut out of the cross section of steel pipe, and Vickers hardness test is conducted in at least five locations at the position 1 mm deep from the inner and outer surfaces of steel pipe and in the central portion of wall thickness thereof, respectively, whereby the mean value of hardness and the difference between the maximum value and the minimum value are determined.

As described above, in order to assure the SSC resistance while the strength of steel pipe is enhanced, the surface hardness must be kept low. If the difference in average hardness between at the position 1 mm deep from the surface of steel pipe and in the central portion of wall thickness thereof is larger than 30 HV10, it is sometimes difficult to assure both of high strength and SSC resistance. Therefore, the difference between the average hardness at the position 1 mm deep from the surface of steel pipe and the average hardness in the central portion of wall thickness is preferably 30 HV10.

Also, even if the difference in average hardness between in a portion near the outer layer of steel pipe and in the central portion of wall thickness thereof is small, if the variations in hardness in the outer layer are large, a portion in which the SSC resistance deteriorates locally is produced, and cracking may occur with this portion being a starting point. Therefore, the difference between the maximum value and the minimum value of the hardness at the position 1 mm deep from the surface is preferably 40 HV10 or smaller.

6. Production Method

The production method for the seamless steel pipe for line pipe according to the present invention is not subject to any special restriction. However, for example, by using the method described below, a seamless steel pipe having a yield strength of 448 MPa or higher and having the highest hardness on the steel pipe surface of 250 HV10 or lower can be produced.

<Melting and Casting>

Concerning the melting and casting, the method carried out in the production method for general seamless steel pipes can be used, and the casting may be ingot casting or continuous casting.

<Hot Working>

After the casting, hot working such as forging, piercing, or rolling is performed to produce a seamless steel pipe. Concerning the conditions in hot working, general conditions used in the production method for seamless steel pipes have only to be applied. For example, a billet produced by continuous casting is heated to a temperature of 1200° C. or higher, and a hollow blank is obtained by using a skew roll piercing machine. This hollow blank is finish rolled into a steel pipe by using a mandrel mill and a sizing mill. In the case where the steel pipe is directly sent to a quenching furnace without being cooled to a temperature lower than the $Ar_a$ transformation point, the pipe-making finishing temperature is preferably set at a temperature of 950° C. or higher.

<Quenching>

After being allowed to cool after having been hot-worked, the steel pipe may be reheated and quenched. However, in order to decrease the highest hardness, it is preferable that the steel pipe be conveyed into the furnace without being allowed to cool before the surface temperature of steel pipe becomes a temperature lower than the $Ar_3$ transformation point, be heated, and be quenched. The heating temperature during quenching is not subject to any special restriction; however, the heating temperature is preferably set at a temperature of $Ac_3$+50° C. or higher. Also, the heating time is not subject to any special restriction; however, the soaking time is preferably set to 5 min or longer.

In the present invention, in order to disperse the metal particles consisting mainly of Ni or Cu in a wide range and to accelerate the growth rate of the scale having a high adhesion, the atmosphere in the furnace is preferably made an oxidizing environment, and specifically, the water vapor concentration is preferably made 5% or higher. In order to accelerate the growth rate of scale stably, the water vapor concentration is further preferably made 10% or higher. The upper limit of the water vapor concentration is not subject to any special restriction. However, the upper limit thereof is preferably made 25% or lower because if the water vapor concentration is excessively high, the service life of furnace wall is shortened.

Concerning the cooling rate during quenching, if the cooling rate is lower than 10° C./s, a sufficient strength cannot be attained, so that accelerated cooling is preferably performed at a cooling rate of 10° C./s or higher. Also, concerning the cooling method, the cooling method is not subject to any special restriction as far as accelerated cooling can be performed; however, water cooling is preferably performed.

<Tempering>

After quenching, tempering is preferably performed. The tempering temperature is not subject to any special restriction. However, the tempering temperature is preferably set at a temperature of $Ac_1$−50° C. or lower because if tempering is performed at a temperature of higher than $Ac_1$−50° C., the strength is decreased remarkably, and a yield strength of 448 MPa or higher cannot be assured in some cases.

Hereunder, the present invention is explained more specifically with reference to Examples; however, the present invention is not limited to these Examples.

EXAMPLE 1

Steels having the chemical compositions given in Table 1 were melted in a converter, and billets were obtained by continuous casting. Each of the billets was formed into a pipe having an outside diameter of 323.9 mm, a wall thickness of 37.0 mm, and a length of 12,000 mm by the Mannesmann-mandrel mill process. The hot working was performed under the condition that, for all the billets, the starting temperature was 1200° C. and the finishing temperature was 1050° C. after the billet had been heated to 1250° C.

[Table 1]

TABLE 1

| Steel | Chemical composition (in mass %, balance: Fe and impurities) | | | | | | | | | | | | | | | |
|---|---|---|---|---|---|---|---|---|---|---|---|---|---|---|---|---|
| | C | Si | Mn | P | S | Cr | Mo | Al | N | Ni | Ca | Cu | Ti | Nb | V | Cu + Ni | Mo + V |
| A | 0.06 | 0.13 | 1.51 | 0.011 | 0.001 | 0.25 | 0.08 | 0.037 | 0.004 | 0.20 | 0.0024 | 0.20 | 0.008 | — | 0.06 | 0.40 | 0.14 |
| B | 0.06 | 0.15 | 1.46 | 0.011 | 0.001 | 0.22 | 0.09 | 0.038 | 0.004 | 0.20 | 0.0021 | 0.20 | 0.007 | — | 0.06 | 0.40 | 0.15 |
| C | 0.06 | 0.11 | 1.46 | 0.013 | 0.001 | 0.28 | 0.06 | 0.028 | 0.004 | 0.09 | 0.0013 | 0.14 | 0.007 | — | 0.05 | 0.23 | 0.11 |
| D | 0.06 | 0.09 | 1.46 | 0.010 | 0.001 | 0.25 | 0.05 | 0.036 | 0.005 | 0.15 | 0.0012 | 0.02 | 0.007 | — | 0.06 | 0.17 | 0.11 |
| E | 0.06 | 0.14 | 1.32 | 0.012 | 0.001 | 0.25 | 0.06 | 0.040 | 0.004 | 0.02 * | 0.0022 | 0.02 | 0.010 | — | 0.05 | 0.04 * | 0.11 |
| F | 0.06 | 0.13 | 1.28 | 0.012 | 0.002 | 0.27 | 0.22 | 0.035 | 0.004 | 0.02 * | 0.0018 | 0.02 | 0.007 | — | 0.05 | 0.04 * | 0.27 |

* indicates that conditions do not satisfy those defined by the present invention.

The pipe having been hot-worked and having the temperature given in Table 2 was conveyed into a furnace, and was subjected to heating for quenching. The water vapor concentration in the furnace at that time was as given in Table 2. After being held at 950° C. for 15 min, the pipe was subjected to accelerated cooling by water cooling, and was subjected to quenching treatment. Thereafter, the pipe was subjected to tempering treatment in which the pipe was held at the temperature given in Table 2 for 30 min.

TABLE 2

| Test No. | Steel | Area fraction of bainite (%) | Temperature before conveying into furnace (° C.) | water vapor concentration (%) | Tempering temperature (° C.) | $Ac_1$ (° C.) | $Ac_3$ (° C.) | $Ar_3$ (° C.) | Yield strength (MPa) | Highest hardness (Hv10) |
|---|---|---|---|---|---|---|---|---|---|---|

TABLE 2-continued

| | | | | | | | | | | |
|---|---|---|---|---|---|---|---|---|---|---|
| 1 | A | 85 | 903 | 22 | 650 | 730 | 887 | 756 | 528 | 218 |
| 2 | B | 79 | 864 | 17 | 660 | 731 | 889 | 757 | 513 | 229 |
| 3 | C | 81 | 901 | 15 | 650 | 735 | 888 | 764 | 506 | 226 |
| 4 | D | 75 | 940 | 20 | 650 | 735 | 889 | 765 | 496 | 199 |
| 5 | E * | 75 | 889 | 18 | 650 | 741 | 897 | 779 | 519 | 239 |
| 6 | F * | 83 | 893 | 20 | 650 | 745 | 903 | 773 | 535 | 255 |

| Test No. | Variation in hardness (Hv10) | Difference of hardness between at the surface and the central portion (Hv10) | Distance from a boundary between base metal and scale to a region where metal particles do not exist (μm) | Average diameter of metal particle (μm) | Number density (pieces/ mm$^2$) | |
|---|---|---|---|---|---|---|
| 1 | 25 | 10 | 31 | 1.1 | $2.2 \times 10^4$ | Inventive |
| 2 | 38 | 26 | 29 | 0.9 | $2.4 \times 10^4$ | example |
| 3 | 33 | 17 | 26 | 1.2 | $1.5 \times 10^4$ | |
| 4 | 37 | 17 | 25 | 1.0 | $1.6 \times 10^4$ | |
| 5 | 34 | 34 | Not exist * | — | — | Comparative |
| 6 | 46 | 29 | Not exist * | — | — | example |

* indicates that conditions do not satisfy those defined by the present invention.

In a location near the boundary between base metal and scale of the obtained steel pipe, a backscattered electron image and an element mapping image obtained by EPMA were acquired, and on the basis of these images, the distribution of metal particles consisting mainly of Ni or Cu was examined. The distance from the boundary between base metal and scale to the region in which the metal particles do not exist and the number density of metal particles observed per unit area at the position 10 μm distant from the boundary to the scale side were measured. The results of these measurements are also given in Table 2.

Also, a test specimen was cut out of the seamless steel pipe. By using this test specimen, the metal micro-structure was observed, and the yield strength and surface hardness were measured. The observation of metal micro-structure was made by the procedure described below. First, the metal micro-structure was made to appear with nital etching reagent in the central portion of the wall thickness of steel pipe. Subsequently, three optical micro-structure photographs of 500 μm square were taken in the central portion of the wall thickness of steel pipe. On each of the micro-structure photographs, straight lines were drawn in the longitudinal direction and the transverse direction at a pitch of 25 μm, and the number of lattice points on the ferrite structure was counted. Then, the number of lattice points on the ferrite structure was subtracted from the number of all lattice points, and the ratio was determined in percentage. The obtained ratio was made the area fraction of bainite on each micro-structure photograph. The average bainite area fraction was determined by arithmetically averaging the bainite area fractions obtained by each of the micro-structure photographs.

The yield strength was measured by the procedure described below. From the central portion of wall thickness of each steel pipe, a No. 14A tension test specimen (a round bar test specimen having a diameter of 8.5 mm) specified in JIS Z 2241 (2011) was sampled. By using the sampled test specimen, a tension test in conformity to JIS Z 2241 (2011) was conducted in the atmosphere at normal temperature (25° C.), and the yield strength (0.2% yield stress) was determined.

Furthermore, on the cross section of the test specimen, in eight locations at intervals of 1 mm from the surface, Vickers hardness test was conducted with the test force of 98.07N (10 kgf). The area fraction of bainite, the highest hardness at a position 1 mm deep from the surface, the variation in hardness, and the difference in hardness between surface and central portion of wall thickness are also given in Table 2. The variation in hardness in Table 2 indicates the difference between the maximum value and the minimum value of hardness.

Figure 2:
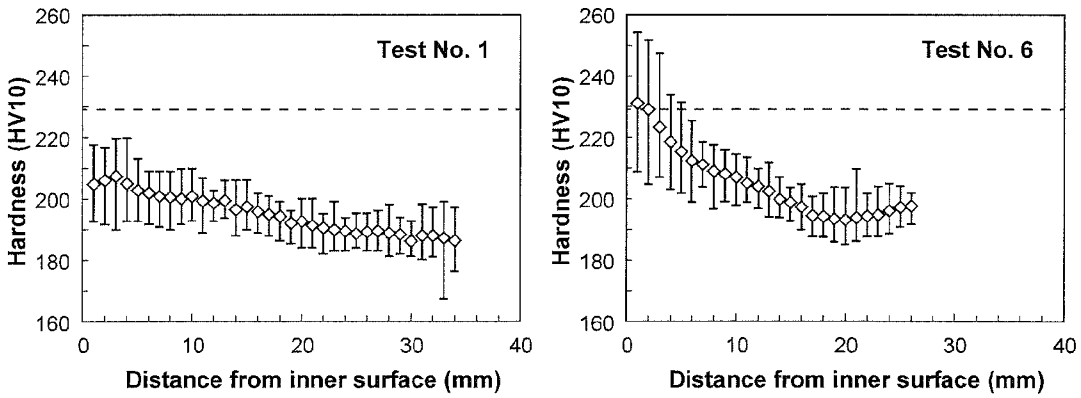
FIG. 2 is diagrams showing the hardness distributions of the seamless steel pipes in accordance with an inventive example and a comparative example.

FIG. 2 is diagrams showing the hardness measurement results in test Nos. 1 and 6. The plot in the figure shows the mean value of measurement values at eight locations, and the error bar shows the difference between the maximum value and the minimum value of hardness. In Example 1, a highest hardness of 230 HV10 or lower was judged to be a good result.

As can be seen from Table 2 and FIG. 2, in test No. 6, which was a comparative example, metal particles consisting mainly of Ni or Cu did not exist in the scale, resulting in the deteriorated adhesion of scale. And, the variation in hardness at a position 1 mm deep from the surface was caused to be larger than 40 HV10 due to detachment of scale and the occurrence of variations in cooling rate. Also, the difference between the average hardness at the position 1 mm deep from the surface and the average hardness in the central portion of wall thickness was relatively large. Further, the highest hardness was as high as 255 HV10, and the result was that the SSC resistance was poor.

Likewise, in test No. 5, since the Ni content was outside of the defined range, metal particles did not exist sufficiently in the scale, so that the result was that the adhesion was bad.

On the other hand, in test No. 1, which was an inventive example, $2.2\times10^4$ pieces/mm$^2$ of metal particles consisting mainly of Ni or Cu with an average circle-equivalent diameter of 1.1 μm existed, and the distance from the boundary between base metal and scale to the region in which metal particles did not exist was 31 μm, so that the adhesion of scale was good. Therefore, there is obtained good results that the cooling rate on the surface was uniform, the difference between the average hardness at the position 1 mm deep from the surface and the average hardness in the central portion of wall thickness was as small as 10 HV10, and the variation in hardness at the position 1 mm deep from the surface was 25 HV10. Also, it can be seen that the highest hardness was as low as 218 HV10, and the SSC resistance was excellent.

Likewise, in test Nos. 2 to 4, the yield strength was 496 MPa or higher, and therefore the steel pipes had excellent strengths. Also, the metal particles consisting mainly of Ni or Cu existed to a position 20 μm or larger distant from the boundary between base metal and scale, and the number density was $1.5\times10^4$ pieces/$mm^2$ or higher, so that the adhesion of scale was good. Therefore, the highest hardness at the position 1 mm deep from the surface was as low as 229 HV10 or lower, and therefore the result was that the SSC resistance was excellent.

EXAMPLE 2

Steels having the chemical compositions given in Table 3 were melted in a converter, and a plurality of billets were obtained by continuous casting. Each of the billets was formed into a pipe having the wall thickness given in Table 4 and a length of 12,000 mm by the Mannesmann-mandrel mill process. The hot working was performed under the condition that, for all the billets, the starting temperature was 1200° C. and the finishing temperature was 1050° C. after the billet had been heated to 1250° C. After the hot working, the pipe was cooled by being allowed to cool.

TABLE 3

| Steel | Chemical composition (in mass %, balance: Fe and impurities) | | | | | | | | | | | | | | | |
|---|---|---|---|---|---|---|---|---|---|---|---|---|---|---|---|---|
| | C | Si | Mn | P | S | Cr | Mo | Al | N | Ni | Ca | Cu | Ti | Nb | V | Cu + Ni | Mo + V |
| G | 0.07 | 0.12 | 1.51 | 0.008 | 0.0009 | 0.31 | 0.25 | 0.033 | 0.005 | 0.31 | 0.0016 | 0.20 | 0.002 | 0.001 | 0.05 | 0.51 | 0.30 |
| H | 0.06 | 0.13 | 1.53 | 0.005 | 0.0008 | 0.27 | 0.11 | 0.030 | 0.005 | 0.23 | 0.0009 | 0.20 | 0.002 | 0.001 | 0.05 | 0.43 | 0.16 |
| I | 0.07 | 0.11 | 1.71 | 0.007 | 0.0008 | 0.28 | 0.22 | 0.033 | 0.005 | — * | 0.0009 | — | 0.002 | 0.001 | 0.05 | — * | 0.27 |
| J | 0.06 | 0.11 | 1.75 | 0.008 | 0.0008 | 0.31 | 0.20 | 0.031 | 0.005 | — * | 0.0019 | — | 0.002 | 0.001 | 0.05 | — * | 0.25 |

* indicates that conditions do not satisfy those defined by the present invention.

TABLE 4

| Test No. | Steel | Area fraction of bainite (%) | Wall thickness (mm) | Temperature before conveying into furnace (° C.) | water vapor concentration (%) | Tempering temperature (° C.) | $Ac_1$ (° C.) | $Ac_3$ (° C.) | $Ar_3$ (° C.) |
|---|---|---|---|---|---|---|---|---|---|
| 7 | G | 85 | 45 | 25 | 18 | 650 | 723 | 885 | 733 |
| 8 | H | 75 | 38 | 26 | 20 | 630 | 731 | 886 | 752 |
| 9 | I * | 80 | 45 | 24 | 15 | 650 | 730 | 892 | 750 |
| 10 | J * | 85 | 45 | 24 | 21 | 650 | 732 | 895 | 750 |

| Test No. | Yield strength (MPa) | Highest hardness (Hv10) | Distance from a boundary between base metal and scale to a region where metal particles do not exist (μm) | Average diameter of metal particle (μm) | Number density (pieces/$mm^2$) | |
|---|---|---|---|---|---|---|
| 7 | 540 | 240 | 25 | 1.1 | $2.0\times10^4$ | Inventive |
| 8 | 510 | 225 | 20 | 1.2 | $1.9\times10^4$ | example |
| 9 | 530 | 260 | Not exist * | — | — | Comparative |
| 10 | 525 | 255 | Not exist * | — | — | example |

* indicates that conditions do not satisfy those defined by the present invention.

After the pipe having been hot-worked had been allowed to cool, the pipe having the temperature given in Table 4 was conveyed into a furnace, and was subjected to heating for quenching. The water vapor concentration in the furnace at that time was as given in Table 4. After being held at 950° C. for 15 min, the pipe was subjected to accelerated cooling by water cooling, and was subjected to quenching treatment. Thereafter, the pipe was subjected to tempering treatment in which the pipe was held at the temperature given in Table 4 for 30 min On the obtained steel pipe, as in Example 1, the distance from the boundary between base metal and scale to the region in which the metal particles do not exist and the number density of metal particles observed per unit area at the position 10 μm distant from the boundary to the scale side were measured.

Also, a test specimen was cut out of the seamless steel pipe, and by the same methods as those of Example 1, the metal micro-structure was observed, and the yield strength and surface hardness were measured. Further, on the cross section of the test specimen, in eight locations at intervals of 1 mm from the surface, Vickers hardness test was conducted with the test force of 98.07 N (10 kgf), and the highest hardness at the position 1 mm deep from the surface was determined. These results are also given in Table 4. In Example 2, a highest hardness of 250 HV10 or lower was judged to be a good result.

As can be seen from Table 4, in test Nos. 9 and 10, which were comparative examples, metal particles consisting mainly of Ni or Cu did not exist in the scale, so that a result that the adhesion of scale was bad was obtained. Due to detachment of scale and the occurrence of variations in cooling rate, the highest hardness was as high as 255 HV10 or higher, and the result was that the SSC resistance was poor.

On the other hand, in test Nos. 7 and 8, which were inventive examples, the yield strength was 510 MPa or higher, and therefore the steel pipes had excellent strengths. Also, the metal particles consisting mainly of Ni or Cu having an average circle-equivalent diameter of 1.1 μm or larger existed to a position 20 μm or larger distant from the boundary between base metal and scale, and the number density was $1.9\times10^4$ pieces/$mm^2$ or higher, so that the adhesion of scale was good. Therefore, it can be seen that the highest hardness at the position 1 mm deep from the surface was as low as 240 HV10 or lower, and therefore the SSC resistance was excellent.

EXAMPLE 3

Next, in a laboratory, experiments were conducted by controlling the atmosphere in a soaking pit. Steels having the chemical compositions given in Table 5 were melted in a vacuum furnace, and a 180-kg ingot was produced for each of the steels. The produced ingot was charged into a heating furnace, and was soaked at 1250° C. for 1 h. The ingot taken out of the heating furnace was hot-forged into a rectangular prismatic block. The block was charged into the heating furnace, and was soaked at 1250° C. for 30 min. The soaked block was hot-rolled, and a steel sheet with a thickness of 30 mm was produced.

TABLE 5

| | Chemical composition (in mass %, balance: Fe and impurities) | | | | | | | | | | | | | | | |
|---|---|---|---|---|---|---|---|---|---|---|---|---|---|---|---|---|
| Steel | C | Si | Mn | P | S | Cr | Mo | Al | N | Ni | Ca | Cu | Ti | Nb | V | Cu + Ni | Mo + V |
| K | 0.06 | 0.11 | 1.44 | 0.011 | 0.0006 | 0.22 | 0.08 | 0.029 | 0.005 | 0.22 | 0.0016 | 0.22 | 0.007 | — | 0.05 | 0.44 | 0.13 |
| L | 0.06 | 0.10 | 1.46 | 0.014 | 0.0008 | 0.22 | 0.08 | 0.029 | 0.005 | — * | 0.0014 | — | 0.007 | — | 0.05 | — * | 0.13 |

* indicates that conditions do not satisfy those defined by the present invention.

The produced steel sheet having the temperature given in Table 6 was conveyed into a furnace, and was subjected to heating for quenching. The water vapor concentration in the furnace at that time is as given in Table 6. After being held at 950° C. for 15 min, the steel sheet was subjected to accelerated cooling by water cooling, whereby being subjected to quenching treatment. Thereafter, the steel sheet was subjected to tempering treatment in which the steel sheet was held at 650° C. for 30 min.

TABLE 6

| Test No. | Steel | Area fraction of bainite (%) | Temperature before conveying into furnace (° C.) | water vapor concentration (%) | $Ac_1$ (° C.) | $Ac_3$ (° C.) | $Ar_3$ (° C.) | Yield strength (MPa) | Highest hardness (Hv10) |
|---|---|---|---|---|---|---|---|---|---|
| 11 | K | 83 | 900 | 20 | 729 | 887 | 758 | 522 | 227 |
| 12 | L * | 80 | 910 | 20 | 739 | 893 | 780 | 514 | 253 |
| 13 | K | 85 | 897 | 1 | 729 | 887 | 758 | 532 | 254 |

| Test No. | Variation in hardness (Hv10) | Difference of hardness between at the surface and the central portion (Hv10) | Distance from a boundary between base metal and scale to a region where metal particles do not exist (μm) | Average diameter of metal particle (μm) | Number density (pieces/$mm^2$) | |
|---|---|---|---|---|---|---|
| 11 | 8 | 20 | 63 | 1.2 | $2.0 \times 10^4$ | Inv. example |
| 12 | 44 | 54 | Not exist * | — | — | Comparative |
| 13 | 39 | 43 | 13 * | 0.9 | $2.2 \times 10^4$ | example |

* indicates that conditions do not satisfy those defined by the present invention.

Subsequently, by the same methods as those in Examples 1 and 2, the distance from the boundary between base metal and scale to the region in which the metal particles do not exist and the number density of metal particles observed per unit area at the position 10 μm distant from the boundary to the scale side were measured. Then, the metal microstructure was observed, and the yield strength and the hardness on the surface and in the central portion of wall thickness was measured. In Example 3, a highest hardness of 230 HV10 or lower was judged to be a good result.

The results are given in Table 6. In test No. 12, since the Ni content was outside of the defined range of the present invention, even if the atmosphere in the soaking pit was proper, fine metal particles consisting mainly of Ni or Cu did not exist. Therefore, the adhesion of scale was low, and the variation in hardness at the position 1 mm deep from the surface was as large as 44 HV10. Also, the increase in hardness in the outer layer cannot be suppressed, and the difference between the average hardness at the position 1 mm deep from the surface and the average hardness in the central portion of wall thickness was as large as 54 HV10. Furthermore, the result was that the highest hardness was as high as 253 HV10 and the SSC resistance was poor.

Also, in test No. 13, although the chemical composition satisfies the definition of the present invention, the atmosphere in the soaking pit was not proper. Therefore, in most regions, the scale was detached. A small amount of scale adhering to the surface was analyzed. As the result, the metal particles consisting mainly of Ni or Cu existed merely to a position 13 μm distant from the boundary between base metal and scale, which did not satisfy the definition of the present invention. Resultantly, since the adhesion of scale was low, the increase in hardness in the outer layer could not be suppressed, and the difference between the average hardness at the position 1 mm deep from the surface and the average hardness in the central portion of wall thickness was as large as 43 HV10. Further, the result was that the highest hardness was as high as 254 HV10, and the SSC resistance was poor.

On the other hand, in test No. 11, since the chemical composition and the atmosphere in the soaking pit were proper, it was confirmed that fine metal particles consisting mainly of Ni or Cu existed in a region ranging a distance of 63 μm from the boundary between base metal and scale. Therefore, the adhesion of scale was high, and the increase in hardness in the outer layer could be suppressed.

EXAMPLE 4

As in Example 3, in a laboratory, experiments were conducted by controlling the atmosphere in a soaking pit. Steels having the chemical compositions given in Table 7 were melted in a vacuum furnace, and a 180-kg ingot was produced for each of the steels. The produced ingot was charged into a heating furnace, and was soaked at 1250° C. for 1 h. The ingot taken out of the heating furnace was hot-forged into a rectangular prismatic block. The block was charged into the heating furnace, and was soaked at 1250° C. for 30 min The soaked block was hot-rolled, and a steel sheet having the thickness given in Table 8 was produced.

TABLE 7

| | Chemical composition (in mass %, balance: Fe and impurities) | | | | | | | | | | | | | | | | |
|---|---|---|---|---|---|---|---|---|---|---|---|---|---|---|---|---|---|
| Steel | C | Si | Mn | P | S | Cr | Mo | Al | N | Ni | Ca | Cu | Ti | Nb | V | Cu + Ni | Mo + V |
| M | 0.06 | 0.18 | 1.48 | 0.010 | 0.0017 | 0.29 | 0.23 | 0.034 | 0.004 | 0.20 | 0.0021 | — | 0.009 | 0.001 | 0.06 | 0.20 | 0.29 |
| N | 0.06 | 0.11 | 1.48 | 0.009 | 0.0010 | 0.31 | 0.24 | 0.027 | 0.005 | 0.30 | 0.0016 | 0.20 | 0.004 | 0.001 | 0.05 | 0.50 | 0.29 |
| O | 0.06 | 0.11 | 1.47 | 0.010 | 0.0010 | 0.31 | 0.25 | 0.028 | 0.004 | 0.30 | 0.0037 | 0.20 | 0.003 | 0.001 | 0.04 | 0.50 | 0.29 |
| P | 0.07 | 0.11 | 1.48 | 0.010 | 0.0008 | 0.31 | 0.24 | 0.030 | 0.004 | 0.30 | 0.0029 | 0.20 | 0.004 | 0.001 | 0.04 | 0.50 | 0.28 |
| Q | 0.06 | 0.14 | 1.47 | 0.010 | 0.0006 | 0.40 | 0.25 | 0.031 | 0.004 | 0.40 | 0.0021 | 0.35 | 0.001 | 0.027 | — | 0.75 | 0.25 |
| R | 0.03 | 0.14 | 1.39 | 0.007 | 0.0010 | 0.20 | 0.20 | 0.028 | 0.005 | 0.96 | 0.0025 | 0.94 | 0.008 | 0.011 | — | 1.90 | 0.20 |
| S | 0.05 | 0.15 | 1.39 | 0.007 | 0.0010 | 0.20 | 0.20 | 0.028 | 0.004 | 0.96 | 0.0018 | 0.94 | 0,008 | 0.011 | — | 1.90 | 0.20 |
| T | 0.03 | 0.14 | 1.39 | 0.007 | 0.0010 | 0.20 | 0.20 | 0.028 | 0.005 | 1.76 | 0.0025 | 0.94 | 0.008 | 0.011 | — | 2.70 | 0.20 |
| U | 0.06 | 0.15 | 1.45 | 0.010 | 0.0010 | 0.30 | 0.25 | 0.033 | 0.004 | 0.30 | 0.0020 | 0.20 | 0.008 | 0.001 | 0.10 | 0.50 | 0.35 * |
| V | 0.06 | 0.14 | 1.21 | 0.010 | 0.0009 | 0.30 | 0.96 * | 0.029 | 0.005 | 0.15 | 0.0016 | 0.15 | 0.001 | 0.001 | 0.05 | 0.30 | 1.01 * |
| W | 0.06 | 0.15 | 1.23 | 0.010 | 0.0009 | 0.76 | 0.50 * | 0.024 | 0.004 | 0.01 * | 0.0015 | 0.01 | 0.001 | 0.001 | 0.05 | 0.02 * | 0.55 * |

* indicates that conditions do not satisfy those defined by the present invention.

TABLE 8

| Test No. | Steel | Area fraction of bainite (%) | Wall thickness (mm) | Temperature before conveying into furnace (° C.) | Heating temperature during quenching (° C.) | water vapor concentration (%) | Tempering temperature (° C.) | $Ac_1$ (° C.) | $Ac_3$ (° C.) | $Ar_3$ (° C.) |
|---|---|---|---|---|---|---|---|---|---|---|
| 14 | M | 83 | 30 | 22 | 950 | 18 | 650 | 739 | 900 | 770 |
| 15 | N | 80 | 45 | 20 | 950 | 20 | 650 | 733 | 889 | 748 |
| 16 | O | 69 | 45 | 20 | 950 | 20 | 650 | 733 | 887 | 749 |
| 17 | P | 84 | 45 | 20 | 950 | 20 | 650 | 732 | 882 | 745 |
| 18 | Q | 85 | 53 | 25 | 950 | 20 | 650 | 731 | 879 | 705 |
| 19 | R | 85 | 30 | 22 | 900 | 15 | 625 | 702 | 870 | 682 |
| 20 | S | 88 | 30 | 22 | 900 | 15 | 625 | 703 | 860 | 675 |
| 21 | T | 92 | 30 | 22 | 900 | 18 | 650 | 684 | 850 | 650 |
| 22 | U * | 75 | 45 | 21 | 950 | 20 | 650 | 732 | 899 | 742 |
| 23 | V * | 75 | 45 | 21 | 920 | 20 | 650 | 755 | 926 | 770 |
| 24 | W * | 88 | 40 | 21 | 920 | 20 | 650 | 766 | 913 | 751 |
| 25 | M | 87 | 30 | 24 | 950 | 1 | 650 | 739 | 900 | 770 |
| 26 | N | 85 | 45 | 21 | 950 | 2 | 650 | 733 | 889 | 748 |
| 27 | O | 72 | 45 | 21 | 950 | 1 | 650 | 733 | 887 | 749 |
| 28 | P | 88 | 45 | 21 | 950 | 1 | 650 | 732 | 882 | 745 |

| Test No. | Yield strength (MPa) | Highest hardness (Hv10) | Distance from a boundary between base metal and scale to a region where metal particles do not exist (μm) | Average diameter of metal particle (μm) | Number density (pieces/$mm^2$) | |
|---|---|---|---|---|---|---|
| 14 | 530 | 241 | 29 | 1.1 | $1.4 \times 10^4$ | Inventive example |
| 15 | 510 | 242 | 28 | 1.2 | $2.0 \times 10^4$ | |
| 16 | 490 | 230 | 30 | 1.1 | $1.8 \times 10^4$ | |
| 17 | 502 | 240 | 35 | 1.3 | $1.9 \times 10^4$ | |
| 18 | 529 | 245 | 32 | 1.3 | $2.1 \times 10^4$ | |
| 19 | 543 | 235 | 29 | 1.2 | $1.9 \times 10^4$ | |
| 20 | 550 | 240 | 28 | 1.3 | $1.8 \times 10^4$ | |
| 21 | 560 | 238 | 30 | 1.3 | $1.9 \times 10^4$ | |
| 22 | 590 | 300 | 29 | 1.1 | $2.0 \times 10^4$ | Comparative example |
| 23 | 620 | 270 | 25 | 1.2 | $1.6 \times 10^4$ | |
| 24 | 563 | 265 | Not exist * | — | — | |

TABLE 8-continued

| | | | | | |
|---|---|---|---|---|---|
| 25 | 547 | 255 | 8 | 0.9 | $1.8 \times 10^4$ |
| 26 | 522 | 259 | 10 | 1.1 | $1.7 \times 10^4$ |
| 27 | 505 | 251 | 15 | 1.2 | $2.1 \times 10^4$ |
| 28 | 516 | 252 | 9 | 0.9 | $1.5 \times 10^4$ |

* indicates that conditions do not satisfy those defined by the present invention.

After the produced steel sheet had been allowed to cool, the steel sheet having the temperature given in Table 8 was conveyed into a furnace, and was subjected to heating for quenching. The water vapor concentration in the furnace at that time was as given in Table 8. After being held at the temperature given in Table 8 for 15 min, the steel sheet was subjected to accelerated cooling by water cooling, whereby being subjected to quenching treatment. Thereafter, the steel sheet was subjected to tempering treatment in which the steel sheet was held at the temperature given in Table 8 for 30 min.

Subsequently, by the same methods as those in Examples 1 to 3, the distance from the boundary between base metal and scale to the region in which the metal particles do not exist and the number density of metal particles observed per unit area at the position 10 μm distant from the boundary to the scale side were measured. Then, the metal microstructure was observed, and the yield strength and the surface hardness were measured. In Example 4, a highest hardness of 250 HV10 or lower was judged to be a good result.

The results are given in Table 8. In test Nos. 22 to 24, since the total content of Mo and V falls outside of the defined range of the present invention, the result was that the highest hardness was as high as 253 HV10, and the SSC resistance was poor. In particular, in test No. 24, since the Ni content was also outside of the defined range of the present invention, even if the atmosphere in the soaking pit was proper, fine metal particles consisting mainly of Ni or Cu did not exist. Therefore, since the adhesion of scale was low, the increase in hardness in the outer layer could not be suppressed.

Also, in test Nos. 25 to 28, although the chemical composition satisfied the definition of the present invention, the atmosphere in the soaking pit was not proper. Therefore, the metal particles consisting mainly of Ni or Cu existed merely to a position 15 μm or shorter distant from the boundary between base metal and scale, which did not satisfy the definition of the present invention. As the result, the adhesion of scale was low, the highest hardness on the surface was as high as 251 HV10 or higher, and the SSC resistance was poor.

On the other hand, in test Nos. 14 to 21, since the chemical composition and the atmosphere in the soaking pit were proper, it was confirmed that fine metal particles consisting mainly of Ni or Cu existed to a region 20 μm or longer distant from the boundary between base metal and scale. Therefore, the adhesion of scale was high, and the increase in hardness in the outer layer could be suppressed.

INDUSTRIAL APPLICABILITY

According to the present invention, the steel pipe has a yield strength of 448 MPa or higher, and also the highest hardness on the surface of steel pipe can be restrained to 250 HV10 or lower, preferably 230 HV10 or lower, so that a high-strength and high-toughness seamless steel pipe excellent in SSC resistance can be obtained. Therefore, the seamless steel pipe in accordance with the present invention can be used suitably as a line pipe for transmitting crude oil and natural gas containing large amounts of $H_2S$.

What is claimed is:

1. A seamless steel pipe for line pipe, wherein a chemical composition consists, by mass percent, of
C: 0.03 to 0.10%,
Si: 0.50% or less,
Mn: 1.0 to 2.0%,
P: 0.050% or less,
S: 0.005% or less,
Cr: 0.05 to 1.0%,
Mo: 0.01 to 0.30%,
Al: 0.001 to 0.10%,
N: 0.01% or less,
Ni: 0.04 to 2.0%,
Ca: 0.0005 to 0.0050%,
Cu: 0 to 2.0%,
Ti: 0 to 0.05%,
Nb: 0 to 0.05%,
V: 0 to 0.10%,
the balance: Fe and impurities, and
the chemical composition satisfies the conditions of
Cu+Ni: 0.10% or more, and
Mo+V: 0.30% or less, wherein
in a scale formed on the surface of the steel pipe, metal particles comprising Ni or Cu having an average circle-equivalent diameter of 0.1 to 5 μm exist, and a distance from a boundary between the base metal of the steel pipe and the scale to a region in which the metal particles do not exist is 20 μm or longer.

2. The seamless steel pipe for line pipe according to claim 1, wherein
the chemical composition contains, by mass percent, one or more elements selected from
Cu: 0.01 to 2.0%,
Ti: 0.003 to 0.05%,
Nb: 0.01 to 0.05%, and
V: 0.02 to 0.10%.

3. The seamless steel pipe for line pipe according to claim 1, wherein
the chemical composition consists, by mass percent, of
C: 0.03 to 0.10%,
Si: 0.30% or less,
Mn: 1.00 to 1.80%,
P: 0.020% or less,
S: 0.003% or less,
Ti: 0.001 to 0.015%,
Al: 0.001 to 0.050%,
Ni: 0.04 to 0.30%,
Cu: 0 to 0.30%,
Cr: 0.05 to 0.40%,
Mo: 0.02 to 0.15%,
V: 0.02 to 0.09%,
Ca: 0.0005 to 0.0030%,
N: 0.008% or less,
the balance: Fe and impurities, and
the chemical composition satisfies the conditions of Cu+Ni: 0.10 to 0.50%, and Mo+V: 0.05 to 0.20%.

4. The seamless steel pipe for line pipe according to claim 3, wherein the highest hardness at a position 1 mm deep from the surface is 230 HV10 or lower.

5. The seamless steel pipe for line pipe according to claim 1, wherein:

a metal micro-structure of the steel pipe contains bainite of 50% or more in area fraction; and a wall thickness of the steel pipe is 30 mm or larger.

6. The seamless steel pipe for line pipe according to claim 1, wherein at a position 10 μm distant from the boundary to the scale side, the number density of the metal particles observed per unit area is $5\times10^3$ pieces/$mm^2$ or higher.

7. The seamless steel pipe for line pipe according to claim 1, wherein a difference between the average hardness at the position 1 mm deep from the surface of the steel pipe and the average hardness in the central portion of the wall thickness is 30 HV10 or smaller.

8. The seamless steel pipe for line pipe according to claim 1, wherein a difference between the maximum value and the minimum value of the hardness at the position 1 mm deep from the surface of the steel pipe is 40 HV10 or smaller.

* * * * *